Sept. 25, 1928.
T. P. KIMMAN
1,685,406
CLEANING AND POLISHING WHEEL
Filed Aug. 5, 1926
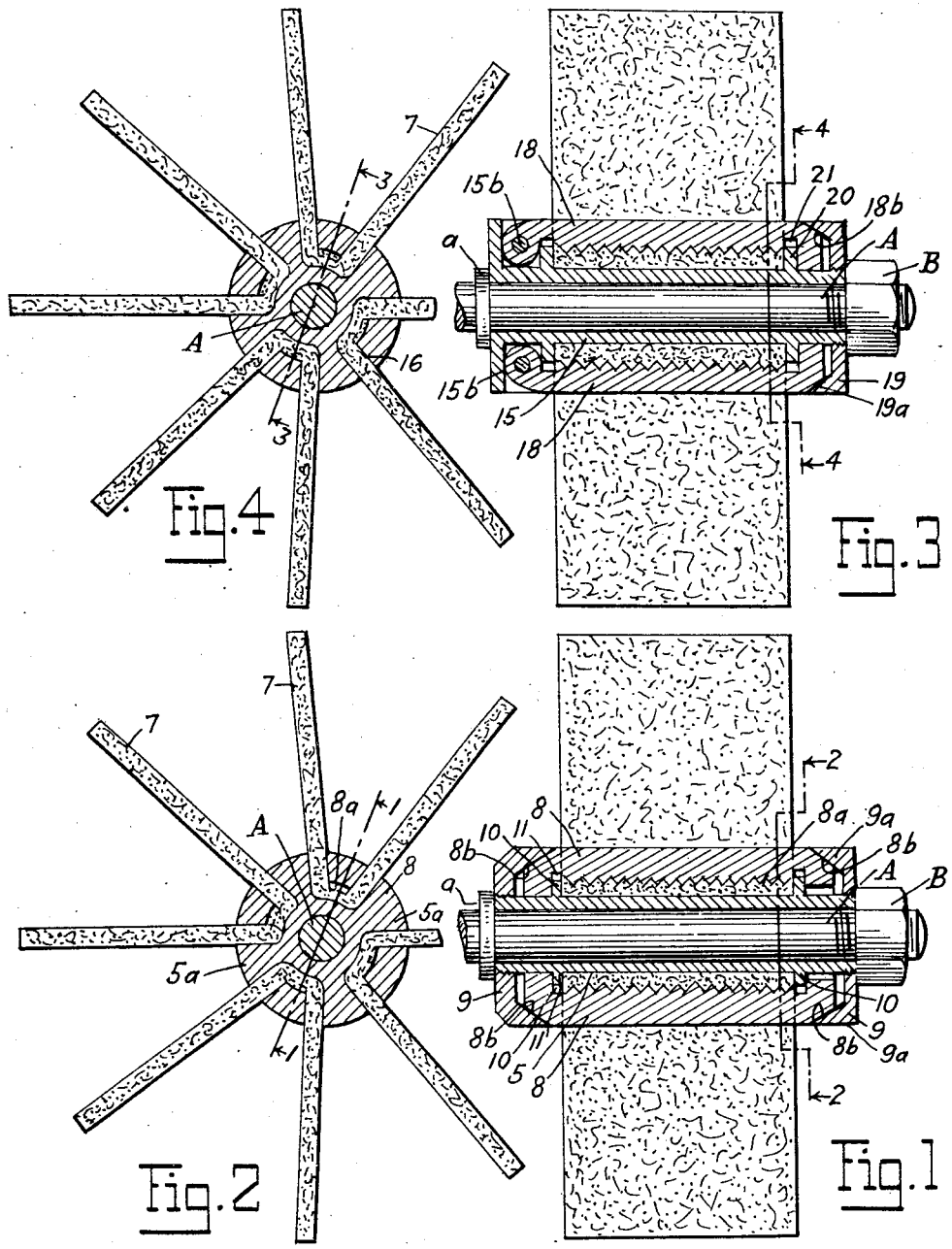
INVENTOR.
Theodore P. Kimman
BY
Ira L. Nickerson
ATTORNEY.

Patented Sept. 25, 1928.

1,685,406

UNITED STATES PATENT OFFICE.

THEODORE P. KIMMAN, OF CLEVELAND, OHIO, ASSIGNOR TO CHICAGO PNEUMATIC TOOL COMPANY, OF NEW YORK, N. Y., A CORPORATION OF NEW JERSEY.

CLEANING AND POLISHING WHEEL.

Application filed August 5, 1926. Serial No. 127,222.

This invention relates to devices intended for cleaning and polishing, particularly of the type adapted to be mounted upon a rotating spindle. It has special application to that form of device of the described type which has radially disposed working members, one form of which is commonly referred to as a buffing wheel. It will be clear, however, from the more detailed description which follows that the invention, in certain of its aspects at least, is by no means restricted to any specific form of device but is of rather general application.

Among the objects of the invention are to reduce wind resistance in devices of the described type, to improve the hub construction, to facilitate and to expedite the assembly and the renewal of the operative parts, and in general to improve and to render more practical devices of the type described.

In order to illustrate the invention concrete embodiments thereof are shown in the accompanying drawings, in which;

Fig. 1 is a longitudinal vertical sectional view of a buffing wheel mounted upon a rotatable shaft, the section being substantially on line 1—1 of Fig. 2;

Fig. 2 is a transverse sectional view substantially on the broken line 2—2 of Fig. 1;

Fig. 3 is a sectional view similar to Fig. 1 showing a modification taken substantially on the line 3—3 of Fig. 4; and Fig. 4 is a transverse sectional view substantially on the broken line 4—4 of Fig. 3.

The embodiments of the invention chosen for the purpose of illustration comprise devices commonly known as buffing wheels of the paddle wheel type. These illustrative forms of the invention are shown as mounted upon a rotatable spindle A, which may be a grinder arbor for example and may be provided with stop collar a.

The buffing wheel shown in Figs. 1 and 2 comprises a hub 5 arranged to telescope over spindle A and provided upon its exterior with an annular series of axially disposed recesses 6 in which is secured, in a manner to extend radially from the hub, the operative material for the purposes for which the wheel is intended. The material to be used is extensible and may be metallic, animal, vegetable, or composite, in nature. It is preferably fibrous in the form of strips 7 of a width such that one or more of the strips conform substantially to the length of the radial recesses 6. The material may take the form of a thick mass of fibers as in certain fabrics such as felt. A portion of each strip 7 is disposed within a recess 6, this portion being preferably intermediate the ends of the strip so that the strips take a U or V shape in end elevation (Fig. 2) with the ends thereof extending substantially radially from the hub 5. The portions of strips 7 disposed within recesses 6 are held therein by suitable retainer members or bars 8 which seat within the recesses 6 over strips 7 and have serrations or teeth $8^a$ on their under sides to engage the strips. Retainers 8 are arranged to be forced toward the hub 5 securely to clamp and retain strips 7 in place by suitable means. In the arrangement for this purpose illustrated in Fig. 1 the outer ends of the retainers 8 are suitably bevelled as at $8^b$ and are engaged by clamping members 9 which have projecting annular flanges $9^a$ arranged to telescope over the bevelled ends of retainers 8 and wedge the latter toward hub 5. While the clamping members may be of any desired form, they preferably take the form of clamping nuts having threaded engagement with the ends of the hub 5 as indicated. With this arrangement it is clear that the buffing wheel can be completely assembled and then placed on spindle A as a unit and secured in place by lock nut B. To insure the proper positioning of retainers 8 in recesses 6, cooperating means are provided for this purpose on the retainers and on the hub 5, which means may take the form of projections 10 on the hub engaging cooperating sockets or recesses 11 in retainers 8. As indicated in Fig. 2, hub 5 in transverse section takes the form of a spider with integral radial arms $5^a$ which may interrupt the projections 10 in the intermediate recesses 6 if the projections take the form of annular flanges as indicated.

The alternative form of the invention disclosed in Figs. 3 and 4 is similar in many respects to the form just described, but permits greater ease and speed in the renewal of the extensible strips 7. In this form of the invention, the hub or spider 15 has axial slots 16 in which the felt strips 7 are secured but the left end is larger than the corresponding end of the hub in Fig. 1, so as to permit the pivotal mounting at that end of the retainer bars 18 as on pivots $15^b$. The opposite ends of bars 18 are bevelled at $18^b$ as in Fig. 1 and cooperate similarly with a clamping member 19 having a cooperating projecting flange 19ª. Means for fixing the position of retainers 18 in slots 16 may be provided such as projections 20 cooperating with sockets or recesses 21 in retainers 18, but such means may be dispensed with by reason of the pivotal attachment of the retainer bars to the hub. The projections 20 as well as corresponding projections 10 of Fig. 1 serve additionally to define the space available for the felt strips and to insure the proper positioning of the latter.

In assembling the buffing wheel of the type shown in Figs. 1 and 2 or in renewing the strips 7, it will be necessary to back off the clamping collars 9 in order to permit the removal and insertion of the retainer bars 8. Once assembled the retainer bars 8 are clamped so tightly upon the strips 7 that there is no possibility of their working loose. The form of buffing wheel shown in Figs. 3 and 4 contains all the desirable features of the first form of wheel with the added advantage of much faster assembly, or renewal of strips 7. With the wheel in place on spindle A is is only necessary to remove the spindle nut B and back off the clamping member 19 whereupon retainer bars 18 may be lifted on their hinges or pivots 16ᵇ to permit the removal of worn strips 7 and the insertion of new ones.

From the above it will be apparent that the present invention provides a hub of small diameter for cleaning and polishing wheels of the paddle type, that the strips of extensible material forming the working substance are mounted so as to be close to the spindle to which the wheel is attached thereby reducing the wind resistance of devices of this type, that means are provided for quick and convenient assembly of the wheels and renewal of the working material, that the working material is positively and securely gripped and retained in place, and that the invention contemplates the use of relatively few and simple parts which can be cheaply manufactured.

While preferred forms of the invention have been herein shown and described it is to be understood that the invention is not limited to the specific details thereof but covers all changes, modifications and adaptations within the scope of the appended claims.

I claim as my invention:

1. A wheel for cleaning and polishing purposes comprising a hub, means on said hub providing radial recesses, strips of extensible material disposed with their intermediate portions in said recesses, retainer members arranged to cross said portions of said strips and to seat in said recesses, cooperating means on said hub and on said members for fixing the position of said members in said recesses, said hub means also serving to position and maintain said strips in place, and means for forcing said members toward said hub securely to hold said strips in place.

2. A wheel for cleaning and polishing purposes comprising a hub, means on said hub providing radial recesses, strips of extensible material disposed with their intermediate portions in said recesses, retainers arranged to cross said portions of said strips and to seat in said recesses, said hub having projections in said recesses adjacent the ends thereof and said retainers having sockets cooperating with said projections thereby to fix the position of said retainers in said recesses, said projections also defining the space to be occupied by said strips, and a clamping nut having telescopic engagement with said members at one end to force the latter toward said hub thereby securely to hold said strips in place.

3. A wheel for cleaning and polishing purposes comprising an elongate hub having axially disposed radial recesses in the exterior thereof, retainer bars pivotally connected to said hub at one end and arranged to seat in said recesses, said bars being movable on their pivots out of said recesses to permit strips of extensible material to be inserted beneath said bars, and means for engaging the free ends of said bars to force the bars into said recesses thereby securely to clamp the strips of extensible material to said hub.

4. A wheel for cleaning and polishing purposes comprising an elongate hub having axially disposed radial recesses in the exterior thereof, retainer bars pivotally connected to said hub at one end and arranged to seat in said recesses, said bars being movable in their pivots out of said recesses to permit strips of extensible material to be inserted beneath said bars, the under sides of said bars being serrated and the free ends thereof bevelled, and a clamping member arranged telescopically to engage said bevelled ends thereby to force the bars into said recesses and securely hold the strips of extensible material.

5. A buffing wheel of the paddle wheel type comprising an elongate hub, retainer bars pivotally secured at one end to said hub, felt strips having their intermediate portions disposed between said bar and said hub, and means at the other end of said hub arranged to engage the free ends of said bars and force them toward said hub, thereby securely to hold said felt strips in place.

6. A buffing wheel of the paddle wheel type comprising an elongate hub, retainer bars with serrated under faces pivotally secured at one end to said hub, felt strips having their intermediate portions disposed between said bar and said hub and their ends extending substantially radially from said hub, the free ends of said bars being bevelled, and a clamping member in threaded engagement with said hub having a projecting annular flange arranged to be forced over said bevelled ends to force said bars toward said hub.

THEODORE P. KIMMAN.